(12) United States Patent
Sotgiu (10) Patent No.: US 9,415,644 B2
(45) Date of Patent: Aug. 16, 2016

(54) TYRE MOUNTING AND DEMOUNTING APPARATUS WITH LOAD BELT APPARATUS

(71) Applicant: Snap-on Equipment Srl a unico socio, Correggio (IT)

(72) Inventor: Paolo Sotgiu, Modena (IT)

(73) Assignee: SNAP-ON EQUIPMENT SRL A UNICO SOCIO, Correggio (RE) (IT)

( * ) Notice: Subject to any disclaimer, the term of this patent is extended or adjusted under 35 U.S.C. 154(b) by 533 days.

(21) Appl. No.: 13/848,557

(22) Filed: Mar. 21, 2013

(65) Prior Publication Data
US 2014/0283590 A1 Sep. 25, 2014

(51) Int. Cl.
| | |
|---|---|
| E01C 23/00 | (2006.01) |
| G01M 17/02 | (2006.01) |
| B60C 23/00 | (2006.01) |
| B60C 23/02 | (2006.01) |
| B60C 25/05 | (2006.01) |
| B60C 25/138 | (2006.01) |

(52) U.S. Cl.
CPC .......... *B60C 25/056* (2013.04); *B60C 25/0551* (2013.04); *B60C 25/138* (2013.01)

(58) Field of Classification Search
None
See application file for complete search history.

(56) References Cited

U.S. PATENT DOCUMENTS

| | | | | |
|---|---|---|---|---|
| 4,047,479 | A * | 9/1977 | McKay et al. | 101/36 |
| 6,584,835 | B2 * | 7/2003 | Jenniges | G01M 17/022 73/146 |
| 6,615,649 | B1 * | 9/2003 | Kokubu | B29D 30/0016 157/1.17 |
| 7,624,629 | B2 * | 12/2009 | Hanada | G01M 17/022 73/146 |
| 7,684,027 | B2 * | 3/2010 | Douglas et al. | 356/155 |
| 7,908,916 | B2 * | 3/2011 | Jenniges | G01M 17/022 73/146 |
| 8,544,520 | B2 * | 10/2013 | Sotgiu | 157/1.17 |

(Continued)

FOREIGN PATENT DOCUMENTS

| | | |
|---|---|---|
| DE | 19602494 A1 | 7/1997 |
| DE | 102009059183 A1 | 6/2011 |
| EP | 2110270 A1 | 10/2009 |

(Continued)

OTHER PUBLICATIONS

Partial European Search Report issued in European Application No. 13160456.3 dated Jun. 26, 2013.
European Search Report EP 13 16 0456 dated Sep. 26, 2013.

*Primary Examiner* — Michael A Lyons
*Assistant Examiner* — Jermaine Jenkins
(74) *Attorney, Agent, or Firm* — McDermott Will & Emery LLP (57) ABSTRACT

A tire changer, comprising: a mounting device for receiving at least a wheel rim of a wheel/tire assembly, the mounting device having an axis (S), a load belt apparatus being able to contact a peripheral surface of the wheel/tire assembly and to apply a predetermined force to the peripheral surface of the wheel/tire assembly, a control device for controlling the predetermined force applied by the load belt apparatus during a rotation of the wheel/tire assembly about the axis (S) of the mounting device and a sensor device for measuring force variations acting between the peripheral surface of the wheel/tire assembly and the load belt apparatus, wherein supports of the load belt apparatus and of the mounting device are designed for a relative movement of the load belt apparatus and of the mounting device towards each other to apply the predetermined force to the peripheral surface of the wheel/tire assembly.

15 Claims, 8 Drawing Sheets

(56) References Cited

U.S. PATENT DOCUMENTS 8,739,624 B2 * 6/2014 Sotgiu et al. .................. 73/462
8,904,863 B1 * 12/2014 Voeller et al. ................. 73/460

FOREIGN PATENT DOCUMENTS

| EP | 2543980 A1 | 1/2013 |
| WO | 2011/101006 A1 | 8/2011 |

* cited by examiner

TYRE MOUNTING AND DEMOUNTING APPARATUS WITH LOAD BELT APPARATUS

The invention relates to a load belt apparatus, a tyre changer having a load belt apparatus, and a method of measuring force variations acting between a peripheral surface of a wheel/tyre assembly and a load belt apparatus.

A tyre changer and a method for fitting a tyre onto a rim of a vehicle wheel and/or for removing a tyre from a rim of a vehicle wheel is already known from EP 2 110 270 A1. Such a tyre changer comprises at least one fitting and/or removal tool being movably attached to a pillar. The at least one fitting and/or removal tool can be aligned in such a way that a tyre can be fitted onto a tyre or removed from a tyre without damaging the rim.

It is further known from WO 2011/101006 A1 to provide a tyre changer having a load roller for measuring radial and/or lateral forces acting between a tyre and the load roller applying a controlled force onto the rotating tyre. The radial and/or axial force variations can be detected and thereby a tyre non-uniformity can be determined. Furthermore, a tyre/rim matching process can be performed compensating measured force variations and a rim runout by remounting the tyre onto the rim in a different angular position.

However, because a tyre changer or another automotive shop service machine must be designed in view of space requirements available in common automotive shop environments, the size of the load roller used in prior art is limited. Hence, the radius of the load roller usually is restricted to values considerable smaller than the radius of the tyre or tyre/wheel assembly. Consequently, the contact area between the tyre tread and the load roller is not flat, but corresponds to the curved surface of the load roller so that forces measured using the conventional load roller can be merely rough approximations of the real forces occurring at a tyre mounted to a vehicle and rolling on a flat road surface.

The problem of the invention is to provide a tyre changer and a tyre loading apparatus being able to detect a non-uniformity and/or a uniformity of a wheel/tyre assembly under conditions coming close to the real operation conditions of a tyre/wheel assembly mounted to a vehicle and rolling on a flat road surface. Furthermore, the problem of the invention is to provide a method of detecting tyre non-uniformity and/or uniformity of a tyre or a wheel tyre assembly using a tyre changer.

The problem is solved by a tyre changer comprising a mounting device for receiving a wheel/tyre assembly to rotate about an axis, and a load belt apparatus. A load belt of the load belt apparatus is able to contact a peripheral surface of the wheel/tyre assembly to apply a force to the peripheral surface. A control device controls a predetermined force applied by the load belt to the peripheral surface of the tyre. A sensor device measures force variations acting between the peripheral surface of the wheel/tyre assembly and the belt. The force variations are measured particularly along a straight line running through the axis of the mounting device and a center plane of the load belt apparatus. According to the invention, a tyre changer, that means an apparatus which can fit a tyre onto a rim or remove a tyre from a rim, is able to detect force variations between the load belt and the peripheral surface of the wheel/tyre assembly. These detected force variations correspond to non-uniformity of the wheel/tyre assembly and particularly of the tyre. With the inventive tyre changer, force variations are detected which act between the peripheral surface of the wheel/tyre assembly, in particular the tread surface of the tyre, and the load belt. For this purpose, the load belt is pushed along a line (preferably a straight line) with a predetermined force towards the wheel/tyre assembly or the wheel/tyre assembly is pushed towards the load belt. The measured force variations are analyzed and the corresponding non-uniformity is detected. Non-uniformity should be avoided as it causes oscillations on the front and rear axles of a vehicle which leads to a tumbling motion of the wheel and to vibrations acting on the steering wheel. Non-uniformity of a wheel/tyre assembly negatively influences the running characteristics of the vehicle and causes a poor running performance. The control device may comprise limit values of uniformity parameters predetermined by the vehicle manufacturer. If the measured values exceeds these limit values the wheel/tyre assembly is treated or sorted out. The predetermined force or load can be applied by a relative translational movement between the load belt and the wheel/tyre assembly without any momentum acting onto the peripheral surface of the tyre.

At least one of the support means for supporting the mounting device and the load belt apparatus (i.e. the load belt) is designed for a relative movement of the mounting device and the load belt apparatus towards each other to apply the predefined force to the peripheral surface of the tyre. The mounting device and the load belt apparatus can be moved simultaneously or each separately. In a preferred embodiment, the mounting device and the load belt apparatus are moved towards each other along a straight line.

According to an embodiment, the load belt is height adjustably mounted on a vertical support, for instance on a pillar. Therefore, the load belt apparatus can be adapted to the vertical position and to the section width of the wheel/tyre assembly and positioned in such a way that the wheel/tyre assembly is aligned with the load belt apparatus, particularly lies centered to the load belt. According to another embodiment, the load belt apparatus is positioned in a fixed height level. The axial width of the load belt is greater than the width of the current wheel/tyre assemblies so that all current wheel/tyre assemblies can be checked.

The mounting device can be moved (horizontally or radially with respect to the wheel) towards the load belt to allow an engagement of the peripheral surface of the wheel/tyre assembly and of the load belt. Especially, the mounting device is displaceable towards the support frame on which the load belt apparatus is mounted. For the displacement of the mounting device, a linear drive, especially an electro mechanic drive or hydraulic/pneumatic piston-/cylinder drive may be provided. The mounting device may be able to take several positions being differently spaced from the load belt such that the respective peripheral surface of wheel/tyre assembly with different sizes can be positioned in such a way that it engages the load belt.

Alternatively or additionally, the load belt apparatus can be moved (horizontally or radially with respect to the wheel) towards the mounting device to allow an engagement of the peripheral surface of the wheel/tyre assembly and the load belt. The load belt apparatus can be driven by an electro mechanic drive or hydraulic/pneumatic piston/cylinder drive. The load belt apparatus may be able to take several positions being differently spaced from the wheel/tyre assembly such that the respective peripheral surface of wheel/tyre assembly with different sizes can be positioned in such a way that it engages the load belt.

After moving the mounting device and the load belt apparatus towards each other they may be locked in position relative to each other by locking means, in particular during the measurement of the force variations, so that the axis of the mounting device and the load belt apparatus have a constant distance therebetween. The linear drives driving the mounting device or the load belt apparatus, respectively, may include self-locking mechanical means transmitting movement and connected rigidly to the mounting device and the load belt apparatus to establish the locking means. Preferably, the load belt apparatus is supported in a fixed radial position with respect to the wheel/tyre assembly at least during the rotation of the wheel/tyre assembly.

Preferably, a rotary drive, especially an electric motor, is provided for rotating the wheel/tyre assembly about the axis. To detect uniformity of the tyre, the whole circumferential peripheral surface of the tyre is to be "scrolled". Such a drive is used also for fitting a tyre onto a rim and/or removing a tyre from a rim. Alternatively, a second drive, especially an electric motor can be provided for driving the load belt. Alternatively, only one drive is provided driving the load belt and the wheel/tyre assembly for the measurement of the force variations. The load belt driven by a second drive decreases the friction between the peripheral surface of the wheel/tyre assembly and the load belt during the uniformity measurement.

In particular, the load belt apparatus is mounted in such a way that at least the radial force variations acting between the peripheral surface of the wheel/tyre assembly and the load belt are measured. The radial forces are the forces acting substantially perpendicularly to the axis of the tyre. Additionally, the axial or lateral forces can be measured, that means the forces acting substantially in the direction of the axis of the tyre. The force variations can be measured by a sensor device which is linked by force locking to the load belt apparatus or to the mounting device to which the wheel/tyre assembly is fixed.

The sensor device can comprise a strain gauge, a piezoelectric sensor and/or a Hall sensor to measure the axial and/or radial forces. Any known sensor can be used being able to detect lateral and/or radial forces. Preferably, the physical effect created at the force feeling element is transformed into an electric signal.

In particular, the peripheral surface of the wheel/tyre assembly is the tread surface of the tyre. According to the preferred embodiment, a rim with a tyre which can be used as a vehicle wheel is fixed to the mounting device and the wheel is positioned in such a way relative to the load belt apparatus that the tread surface engages the load belt. Afterwards, the wheel is rotated and the force variations between the tread surface and the load belt are measured for detecting a non-uniformity of the wheel/tyre assembly.

Furthermore, the invention relates to a method of measuring force variations acting between a peripheral surface of a wheel/tyre assembly and the load belt, in which the wheel/tyre assembly is mounted on a mounting device of a tyre changer. The mounting device has an axis and the wheel/tyre assembly is rotated about the axis, wherein the load belt applies a predetermined force to a peripheral surface of the wheel/tyre assembly. A control device controls the predetermined force applied by the load belt to the peripheral surface of the wheel/tyre assemble and the sensor device measures force variations acting between the peripheral surface and the load belt. In order to apply the predetermined force to the peripheral surface of the tyre a relative movement of the load belt apparatus and of the mounting device towards each other is carried out. Preferably, the relative movement is carried out along a straight line. With respect to the advantages it is referred to the above mentioned explanations.

In particular, the radial and/or axial force variations are measured by the sensor device which is in force locking connection with the shaft of the mounting device or with the load belt apparatus.

Preferably, signals corresponding to the force variations are sent by the sensor device to the control device. The control device includes analyzing components which analyze the signals and evaluates the uniformity or non-uniformity of the wheel/tyre assembly.

According to the preferred embodiment, the load belt apparatus is kept fixed in position while the mounting device is horizontally moved in a position in which the load belt engages the peripheral surface of the wheel/tyre surface. Alternatively, the load belt apparatus may be vertically moved and the mounting device is horizontally moved in a position, in which the load belt engages the peripheral surface of the wheel/tyre surface. Alternatively, the load belt apparatus may be vertically and horizontally moved in a position, in which it engages the peripheral surface of the wheel/tyre assembly. According to another embodiment, both the load belt apparatus and the mounting device are moved towards each other. The mounting device and/or the load belt apparatus can be driven by at least one linear drive, especially by an electro mechanic drive to apply the predetermined force onto the peripheral surface of the wheel/tyre assembly. Independently from the type of drive for the mounting device, the drive, in particular the linear drive can include locking, especially self-locking mechanical means which generate the relative movement between the mounting device and the load belt apparatus and are connected rigidly to the mounting device and the load belt apparatus. The locking means can be designed to lock the axis of the mounting device and the load belt apparatus to a constant distance therebetween.

The sensor device can include a load cell or is designed as load cell providing an electric signal which is proportional to the force acting between the peripheral surface of the wheel/tyre assembly and the load belt. The load cell can be provided with a force feeling element which is linked by force locking to the load belt apparatus or to the mounting device, wherein the physical effect created at the force feeling element is transformed into an electric signal. Appropriate loads cells can include strain gauges, piezoelectric elements, Hall elements and/or magneto-elastic elements. The sensor device can be connected to or can include calibration means designed to determine absolute values of the forces acting between the peripheral surface of the wheel/tyre assembly and the load belt. These force values are proportional to the tyre stiffness.

The tyre changer can be provided with a scanning device designed to scan the lateral runout of one tyre side wall or both tyre side walls, particularly at the angular position of wheel assembly corresponding to the load belt apparatus.

The lateral runout is measured preferably while the load belt engages the peripheral surface of the wheel/tyre assembly. The lateral runout of the tyre can be measured also while the load belt is out of engagement which the tyre. Further, the lateral runout can be measured with different inflation pressures (including ambient pressure) of the tyre under loaded condition or under unloaded condition. The measured runout values can be used to determine the tyre stiffness.

The tyre changer can be provided with scanning devices to determine the radial rim runout and to determine the radial runout of the wheel/tyre assembly. The measurement of the radial runout of the wheel/tyre assembly can be performed under loaded condition and under unloaded condition. Further, the tyre changer can be provided with an angular measuring device to determine the angular position of the wheel/tyre assembly during its rotation, especially during the measurement of the force variations and of the several runout measurements. Additionally, the tyre changer can be provided with matching means to remount the tyre on the rim.

During the matching operation, high values of the force variations and low values of the radial rim runout along the periphery of the wheel/tyre assembly are brought into angular positions in which vibrations caused by non-uniformities of the tyre and of the wheel rim are minimized (compensated).

According to an independent further aspect of the invention, the load belt apparatus comprises at least two belt rollers around which the load belt is tensioned. A first and a second belt roller are arranged at the same distance on both sides of the center plane of the load belt apparatus. In an operation condition, i.e. when the load belt engages the tyre surface, the center plane of the load belt apparatus contains the axis of the wheel mounting device and extends perpendicular to a plane containing the parallel axes of the first and the second belt rollers. A run of the load belt engaging the tyre surface is deflected by the load force acting between the tyre surface and the load belt. However, the distance between belt rollers is adjusted such that the contact area of the load belt engaging the tyre does not reach to the belt rollers. In other words, the tyre does not directly act on the belt rollers by squeezing the load belt between the tyre surface and the belt roller surface. At least one of the belt rollers may be resiliently supported to maintain a predetermined tension of the load belt. The amount and the curve of load belt deflection substantially depend on the load force, the distance between the belt rollers, the belt tension, the diameter and the width of the tyre surface, and the tyre inflation pressure. In particular with a low tyre inflation pressure (or with ambient pressure, for example), a high load belt tension and a short distance the resulting load belt deflection is small and the contact area between the tyre and the load belt has a substantially flat shape, i.e. it is nearly flat and represents a good approximation of a real road surface. Even if the tyre inflation pressure corresponds to the normal operation pressure and the predetermined load force applied by the load belt onto the tyre corresponds to normal operation load of the respective vehicle wheel, the deflection of the load belt results in a radius of curvature of the contact area being much larger than that of a conventional load roller. Furthermore, the direction of curvature of the contact area of the tyre surface (tread) is not inverted by the load belt with respect to the non-contact area of the tyre surface. Therefore, the load belt apparatus of the invention provides for very realistic measuring conditions coming close to real operation conditions of a vehicle wheel. In contrast, the conventional load roller inverts the tyre surface curvature in the contact area resulting in movements and deformations of the tyre material quite different from that under real operation conditions of a vehicle wheel running on a flat road.

A further advantage of the load belt apparatus of the invention is that less friction is generated between the tyre surface and the surface of the load belt than between a tyre and a conventional load roller, resulting in less wear. Furthermore, since the load belt is guided around the belt rollers substantially without any sliding contact (no sliding element supporting the contact area of the load belt is used), wear of the load belt and friction forces disturbing the force measurement can be avoided.

In order to avoid movements of the load belt in lateral (axial) directions, the belt rollers may have circumferential protrusions guiding the edges of the load belt, wherein the load belt edges and the protrusions of the belt rollers preferably are slanted so as to form inclined guiding surfaces similar to a V-belt. Also other arrangements known in the art may be used to guide the load belt in axial direction. In this manner, also lateral or axial forces generated between the tyre and the load belt can be transferred to the wheel mounting device or to the load belt apparatus and to the sensor device so that they can be detected by the force sensor device.

In a further development of the invention, the load belt apparatus may comprise a third roller (tensioning roller) arranged opposite to the belt run engaging the tyre so that the first to third rollers form a triangle around which the load belt is tensioned. The tensioning roller divides the free run of the belt into two portions while the axis of the tensioning roller is parallel to the axes of the first and second belt rollers and lies within the center plane of the load belt apparatus. Preferably, the tensioning roller is movable along the center plane and may be resiliently supported to maintain a controlled tension of the load belt. In a further development of the invention, the position of the tensioning roller can be adjusted by the control device in order to control belt tension and belt deflection when loading a tyre.

In a further independent development of the invention, the load belt apparatus may comprise a belt supporting element arranged to support the backside of the load belt in the tyre contact area in order to reduce deflection of the load belt and further flattening the tyre contact surface. The belt supporting element is able to further flatten the tyre contact surface even under high load and high inflation pressure of the tyre without requiring excessive high belt tension. This belt supporting element may be formed by a slide plate on which the backside of the load belt is sliding while engaging the tyre with its front side. The slide area of the belt supporting element preferably is larger than the contact area between the tyre and the load belt. Preferably, the belt supporting element is a supporting roller having an axis parallel to the axes of the first to third belt rollers and supporting the whole width of the load belt in the middle of the tyre contact area. A supporting roller advantageously avoids friction and wear between the load belt and the supporting element so that reliability and accuracy of measurement are further increased. Even under high load and high inflation pressure of a tyre, i.e. close to real operation conditions, the load belt apparatus having the supporting roller can provide for a merely slightly curved tyre contact surface being a good approximation of a flat road surface, while very low friction forces are generated. In this manner, measuring radial and/or lateral forces occurring at a loaded tyre can be measured under conditions very close to real operating conditions, while the tyre loading apparatus does not require a bulky load roller having a very large diameter. Thus, a compact and reliable apparatus and a compact and advanced tyre changer capable of accurate and realistic force measurements can be provided.

Preferably, the belt supporting element is arranged to be movable in a direction perpendicular to the tyre contact surface, i.e. along the center plane of the load belt apparatus in a direction to and from the tyre. The control device may be able to adjust the belt tension by means of the controlled position of the tensioning roller on the one hand, and to adjust the position of the supporting roller on the other hand. In this manner, the shape of the tyre contact surface can be controlled and adjusted according to the predetermined load force, the tyre dimensions (diameter and width) and the tyre inflation pressure so that an optimal shape, i.e. an approximately flat shape can be reached for a measurement operation.

In another embodiment of the invention, the belt supporting element has a fixed position with respect to the first and second belt rollers so that it does not contact the backside of the load belt in an unloaded condition. When the load belt engages the tyre, the belt is deflected and comes into contact with the belt supporting element. The fixed position and the initial distance of the surface of the belt supporting element to the load belt may be determined such that the cooperation of the belt supporting element and the belt tension result in an approximately flat tyre contact surface for a wide variety of tyre types and load conditions.

At least one measured value of the force measurement and/or of the runout measurement may be compared with a respective predetermined force value or runout value for quality check.

It has to be noticed that the load belt apparatus of the invention may also be used in connection with other automotive shop service machines, such as wheel balancers, or with any other tyre handling/testing equipment.

The invention is described in further detail hereinafter with reference to the Figures in which.

It has to be noted that the drawing figures are not true to scale, but are merely used to depict the principles of the invention. In other words, the distances, sizes and the ratios of the components depicted in the drawings may vary within the spirit of the invention. Furthermore, in the following description of preferred embodiments of the invention, the terms left, right, top, bottom and the like relating to the drawing figures are to be interpreted in an orientation in which the reference signs in the drawing can be read. These terms shall not be related to any position or orientation with respect to the whole apparatus in a limiting manner, but merely serve to facilitate understanding of the invention.

Figure 1:
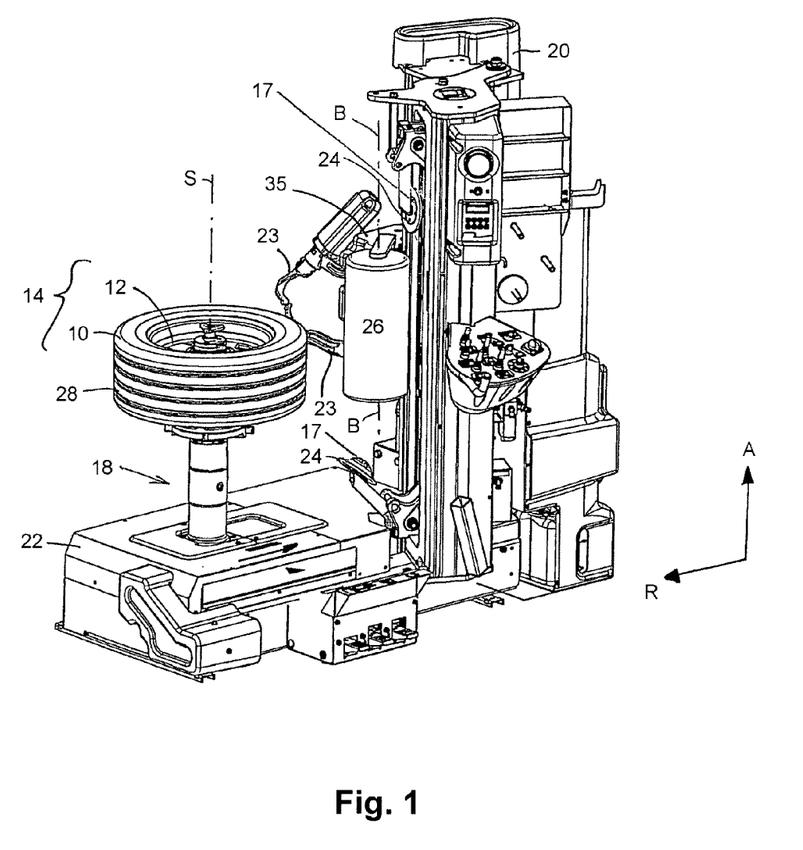
FIG. 1 shows conventional tyre changer with a wheel/tyre assembly and a roller in a position in which the peripheral surface of the wheel/tyre assembly does not engage the roller.
Figure 2:
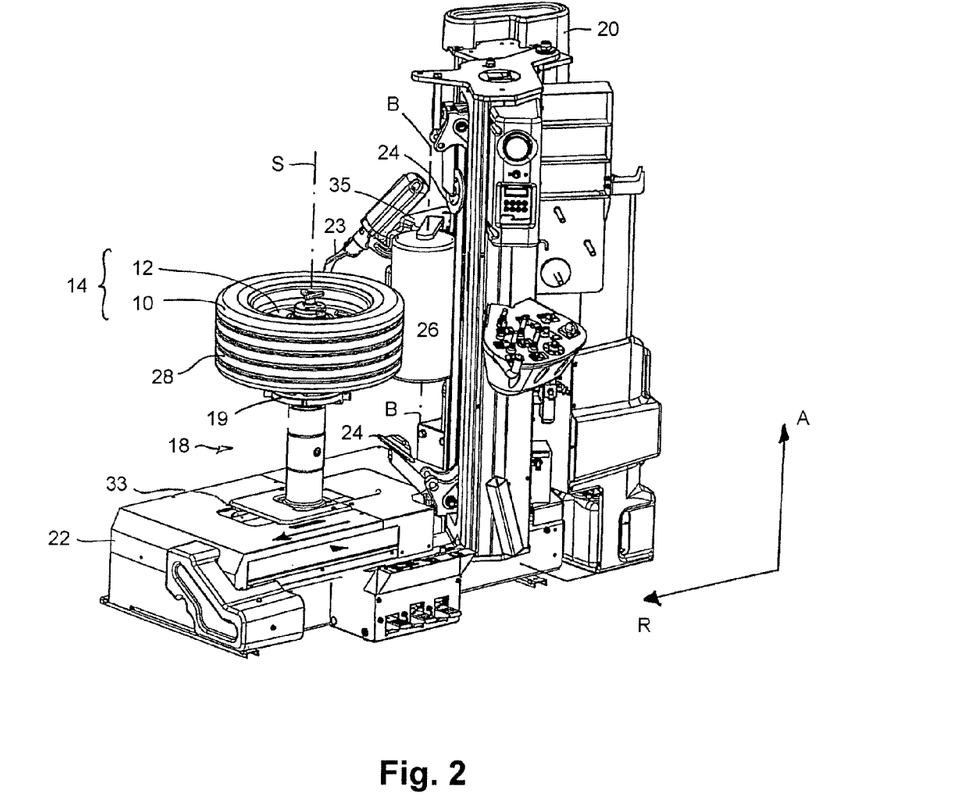
FIG. 2 shows the tyre changer of FIG. 1 with the peripheral surface of the wheel/tyre assembly engaging the roller.

In FIGS. 1 and 2 a tyre changer is shown, that means an apparatus for fitting a tyre 10 onto a wheel rim 12 of a vehicle wheel which constitutes an embodiment of a wheel/tyre assembly 14 or for removing a tyre 10 from a wheel rim 12 of the wheel/tyre assembly. FIGS. 1 and 2 show a tyre changer having a conventional load roller 126 for loading a wheel/tyre assembly and measuring radial and/or lateral forces acting between the tyre and the load roller 126.

Figure 4:
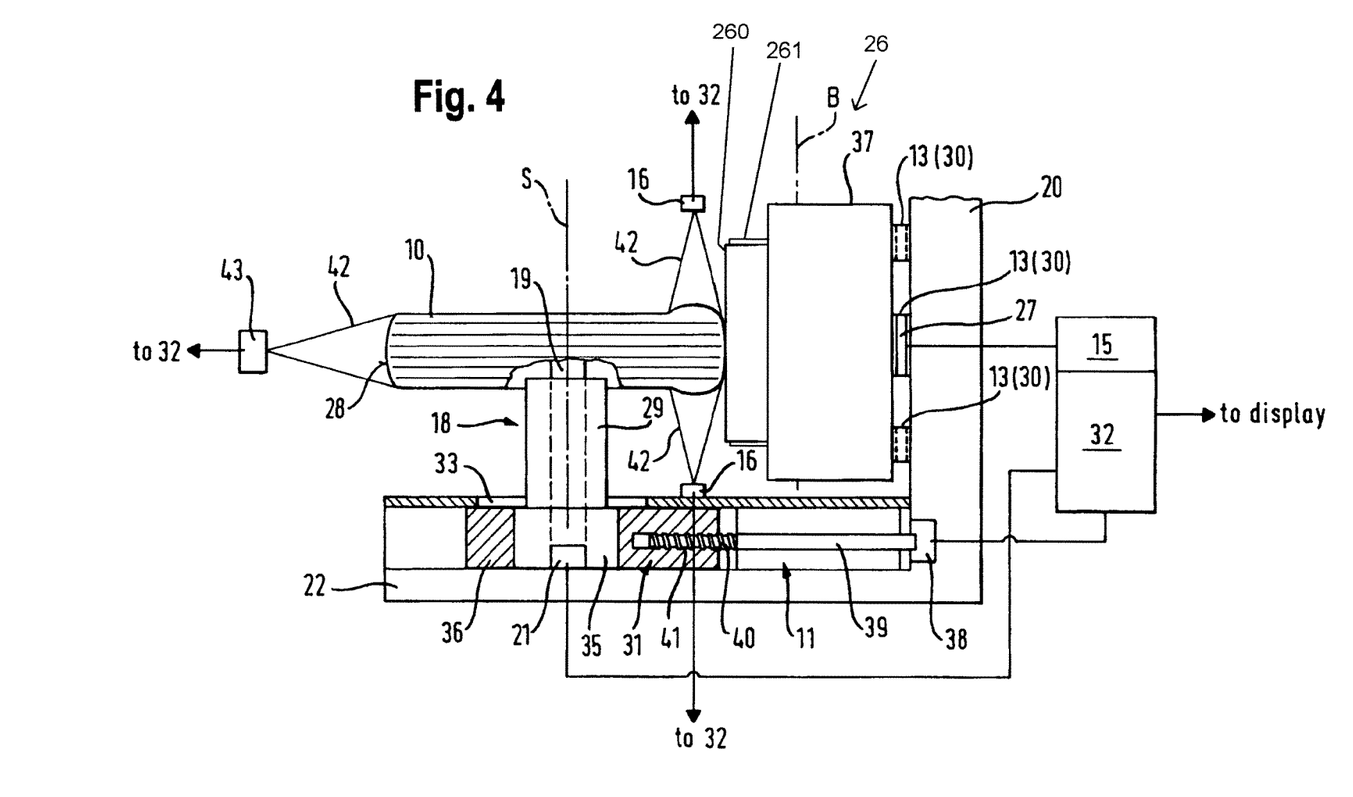
FIG. 4 shows the positions of the wheel/tyre assembly and of the load belt apparatus in their engaging position.

FIG. 4 shows a tyre changer according to the present invention, wherein the conventional load roller 126 of FIGS. 1 and 2 is replaced with a load belt apparatus 26.

The tyre changer comprises a wheel mounting device 18 which has a shaft 19 to which the wheel rim 12 is fixed. The wheel mounting device 18 has an axis 8 and being rotatable about the axis 8 by means of a rotary drive 35 which can be in the form of an electric motor. The wheel rim 12 is non-rotatable connected to the shaft 19 of the mounting device 18 in particular with clamping means and is fixed in such a way that it is centered to the shaft 19. The mounting device 18 is movable towards a support 20 which carries mounting/demounting tools and the conventional load roller 126 or the load belt apparatus 26 according to the invention (see arrow in FIGS. 1 and 2). The support 20 is designed as a vertical pillar of the tyre changer.

Thereby, the mounting device 18 can be fixed in several positions being differently spaced from the support 20. The support 20 extends substantially parallel to the axis (S) of the mounting device 18. The mounting device 18 is supported and guided on a support 22 or base frame for a linear movement, particularly in horizontal direction. The supports 20 and 22 are rigidly connected together. The mounting device 18 can be stationary locked in its position by locking means 31 (FIG. 4) during the measurement. The mounting device 18 includes the rotary drive 35, the shaft 19 and a shaft support 29 which is rigidly connected to a sliding carriage 36 which is guided for a linear movement in the support 22.

At least one fitting and/or removal tool is height-adjustable attached to the support 20. FIGS. 1 and 2 show various types of fitting or removal tools, namely a hook-shaped tool 23 and two bead releasing tools 24. The bead releasing tools 24 can be moved towards each other in parallel relationship with the axis S of the mounting device 18 and—as the wheel is centered positioned to the shaft 19—of the wheel when pressing tyre beads off the rim flanges. The mounting and demounting operations are performed while the wheel/tyre assembly is released from the load belt apparatus 26 (according to FIG. 1).

Furthermore, the load belt apparatus 26 is preferably attached to the support 20 in a fixed position. In this case, according to a further development of the invention, the mounting device 18 may be designed to axially move in order to align the wheel center plane with the load belt apparatus 26 so that the tyre is running in the middle of the load belt.

In another embodiment, the load belt apparatus 26 can be movable in axial direction (i.e. parallel to the rotary axis of the wheel) in order to get aligned with the wheel center plane. In this manner, the load belt apparatus 26 can be centrally positioned to an opposite wheel/tyre assembly 14 and may be adaptable to different widths or rim offsets of wheel/tyre assemblies.

Figure 3:
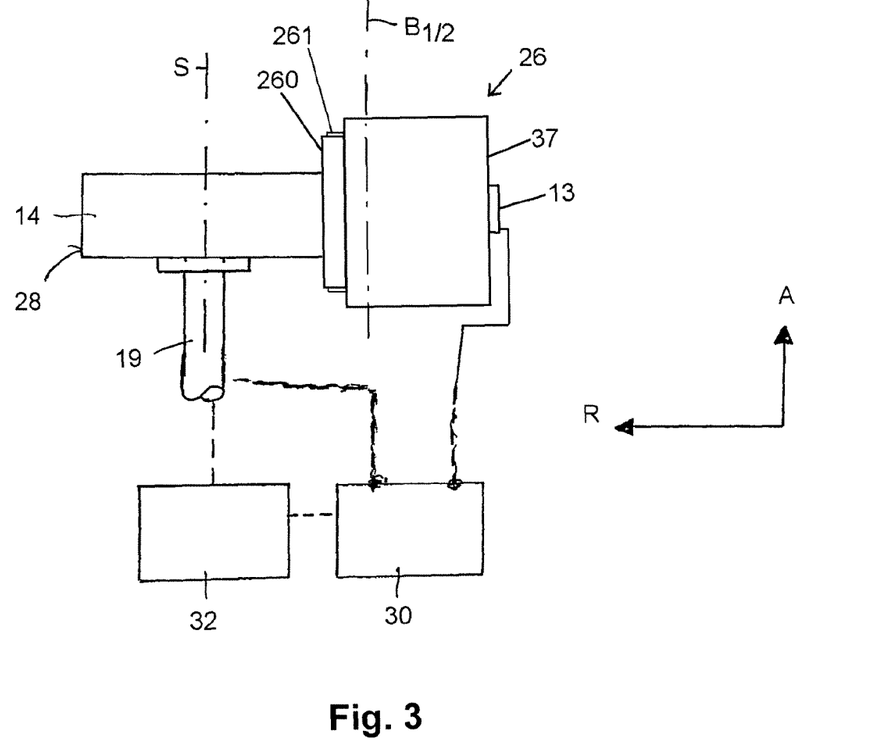
FIG. 3 shows a control device, a sensor device and a load belt apparatus according to the invention which may be used instead of the load roller in the tyre changer of FIGS. 1 and 2.

In FIG. 1, the mounting device 18 is shown in the position, in which a peripheral surface of the wheel/tyre assembly, in particular the tread surface 28, does not engage the roller 126. FIG. 2 shows the position, in which the tread surface 28 engages the roller 126. The same positions shown in FIGS. 1 and 2 apply to the tyre changer having the load belt apparatus 26 according to the invention instead of the load roller 126. The mounting device 18 can be pushed with a predefined force towards the load belt apparatus 26 during a linear movement. A control device 32 being connected to the mounting device 18 and controls the applied predetermined force (see FIGS. 3 and 4). The predetermined force is transmitted directly to the peripheral surface without any momentum. Furthermore, the control device 32 is connected to a sensor device 30. The sensor device 30 is able to measure force variations acting between the tread surface 28 and the load belt apparatus 26. In particular, the sensor device 30 is able to measure axial or lateral forces (see arrow A in FIGS. 1, 2) and/or radial forces (see arrow R in FIGS. 1, 2). Corresponding signals were sent to the control device 32. Depending on detected axial and radial force variations, non-uniformity or uniformity of the tread surface 28 and of the tyre can be determined.

The operation of the tyre changer is as follows. The wheel/tyre assembly 14 is centrally mounted on and fixed to the mounting device 18. Afterwards, the mounting device 18 is driven towards the support 20 as far as the tread surface 28 engages the load belt apparatus 26. By means of the locking means, the mounting device 18 is stationary locked in its position during the measurement of the force variations. A predetermined force is acting between the load belt apparatus 26 and the tread surface 28. The control device 32 controls the predetermined force. Then, the wheel/tyre assembly 14 is rotated by the mounting device 18 and the circumferential surface is "scrolled" by the load belt apparatus 26. Thereby, force variations or forces acting between the tread surface 28 and the load belt apparatus 26 are measured. In particular, the sensor device 30 measures the radial and/or lateral forces and sends corresponding signals to the control device 32 (see arrows R and A in FIGS. 1, 2). Depending on the lateral and radial force variations, non-uniformity or uniformity of the tread surface 28 and of the tyre can be determined by analyzing components of the control device 32.

For example a strain gauge can be part of the sensor device 30. The strain gauge is in force locking connection the load belt apparatus 26 or the shaft 19 of the mounting device 18 (see FIG. 3). Expansions and/or compressions of a force feeling element 27 of the sensor device 30 caused by the forces in the radial and/or axial (lateral) direction (see arrows R and A in FIG. 3) influence the resistance of the strain gauge which can be detected as an electric signal and measured. Piezoelectric devices or Hall sensors or other force measuring devices can be used to measure the forces and force variations.

In a preferred embodiment of the invention, the load belt apparatus 26 is mounted directly to the support 20. In another embodiment, the load belt apparatus 26 may be mounted to a tool carrier 35. Alternatively, the mounting device 18 can be fixedly attached and unmovable to the support frame 22 and the load belt apparatus 26 can be moved by a linear drive in such a way that it is able to engage the tread surface of the tyre to apply a predetermined force to the tread surface of the wheel/tyre assembly. In its position, in which the load belt apparatus 26 engages the tread surface, the load belt apparatus 26 can be stationary locked during the measurement of the force variations by locking means, as will be explained in detail below.

Locking means may be provided between the load belt apparatus 26 or the tool carrier 35 and the support 20. The mounting device 18 can be locked by known locking means which are used for locking the mounting means 18 on the support 22 during the tire mounting/demounting operation. Alternatively, locking means which are supported on the support 22 and support 20 can act between the mounting device 18 and the load belt apparatus 26, as will be explained in connection with FIG. 4.

FIG. 4 shows details of the force measuring equipment according to the invention which can be arranged on a tyre changer, for instance on a tyre changer according to the FIGS. 1 and 2. According to FIG. 4, the load belt apparatus 26 is supported by means of a casing or support frame 37 in a predetermined height level at the vertically extended support 20. The support frame 37 is rigidly connected to the support 20, wherein the sensor device 30 which includes a load cell 13 or which is designed as a load cell is arranged between the support frame 37 and the support 20. The load cell 13 includes a force feeling element 27 which is attached or rigidly connected on one side to the vertical support 20 and on the other side to the support frame 37. The forces acting between the tyre 10 and the load belt apparatus 26 influence the physical behavior of the force feeling element, while the distance between the axis S of the mounting device 18 and of the wheel/tyre assembly 14 and a plane containing the axes B of a first and second belt roller 261 is kept constant during the force measurement. The wheel/tyre assembly 14 is loaded by the load belt apparatus 26 and rotates about its axis which is coaxial with the axis S of the mounting device 18. By means of such a measuring assembly, the spring forces of the tyre 10 are measured directly by the load cell 13, because the distance between the axis S of the mounting device 18 and of the wheel/tyre assembly 14 and the plane of the axes $B_1$ and $B_2$ of the belt rollers 261 is kept constant 20 during the force measurement. The measuring assembly of the invention provides values of the spring forces of the tyre on each angular position around the periphery of the tyre. The measured spring force follows the equation:

$$F_s = F_m - F_l$$

wherein
$F_s$=spring force of the tyre
$F_m$=measured force
$F_l$=constant force applied by the roller onto the surface of the tyre The value of the spring force of the tyre is proportional to the tyre stiffness. The force measuring equipment can include one load cell 13 or one sensor device 30, as shown in FIG. 4, or more load cells or sensor devices, especially two load cells 13 or sensor devices 30 between the support frame 37 and the support 20, as shown in broken lines in FIG. 4. The load cell 13 or sensor device 30 may be arranged at another appropriate place within the arrangement which rigidly connects the shaft 19 of the mounting device 18 and the support frame 37 of the load belt apparatus 26, for instance between the shaft 19 and a shaft support 29 or the sliding carriage 36.

The feeling element 27 may be a deformable body provided with strain gauges whose electrical resistance is changed by a body deformation which can be bending, elongation, compression etc. The force feeling element 27 can be a magneto-elastic body whose deformation creates changes of electrical inductivity. Further, the 10 force feeling element 27 can be a piezo quartz crystal or a Hall element by means of which forces acting on it are transformed into an electrical voltage.

Thus, the load cell 13 or the sensor device 30 is able to provide an electrical signal which is directly proportional to the forces acting between the load belt apparatus 26 and the tyre 10.

The sensor device 30 or the load cell 13 can be connected to calibration means 15 designed to determine an absolute value of the force acting between the peripheral surface 28 of the wheel/tyre assembly 14 and the load belt apparatus 26. In the embodiment of the FIG. 4, the calibration means 15 are integrated into the electronic equipment of the control device 32, but the calibration means 15 can be incorporated in the sensor device 30 or the load cell 13.

The support 20 of the load belt apparatus 26 and a sliding carriage 36 of the mounting device 18 are configured to move the load belt apparatus 26 and the mounting device 18 along a line (preferably a straight line) extending from the axis S of the mounting device 18 along the center plane C of the load belt apparatus 26. In the embodiment of the FIG. 4, the mounting device 18 is driven by a linear drive 11, especially by an electro mechanic drive to apply the predetermined force onto the tread surface 28 of the wheel/tyre assembly 14.

The linear drive 11 includes self-locking mechanical means 31 which transmit the rotary movement of a motor 38 to the mounting device 18. The self-locking mechanism 31 includes a threaded spindle 39 which is rotary driven by the motor 38. A thread 40 of the spindle 39 engages into an internal thread 41 of the sliding carriage 36. During the rotation of the spindle 39, the mounting device 18 and the wheel/tyre assembly 14 are moved along a slotted hole in the support 22 to the load belt apparatus 26 or away from the load belt apparatus 26. For the force measurement, the tyre 10 is pressed against the load belt apparatus 26, as shown in FIG. 4, and the self-locking means 31 lock the axis S of the mounting device 18 and the plane containing the axes B of the first and second belt rollers 261 to a constant distance therebetween. Instead of the self-locking means 31 provided by the thread 40 of the spindle 39 and the internal thread 41 of the sliding carriage 36, other locking means, for instance bolts or the like can be used.

Figure 7:
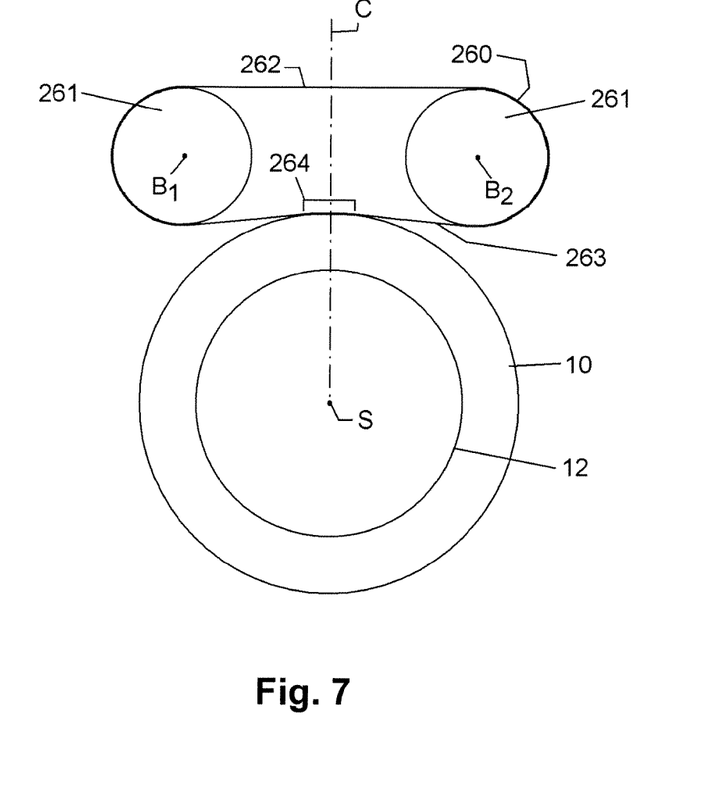
FIG. 7 schematically shows a load belt apparatus according to the invention.

As shown in FIGS. 4 and 7, the load belt apparatus 26 comprises a casing or support frame 37 (not shown in FIG. 7) supporting at least a first and a second belt roller 261 around which a load belt 260 is tensioned. The load belt 260 may have longitudinal protrusions on its backside engaging with circumferential to grooves formed in the cylindrical surface of the belt rollers 261 so that any lateral (axial) movement of the load belt 260 can be suppressed. It is also feasible that the belt rollers 261 have circumferential protrusions engaging both side edges of the load belt 260 for lateral guiding the belt, similar to a v-belt arrangement. These guiding elements are known in the art and not shown in the drawing figures, and enable the load belt apparatus to transfer and measure lateral (axial) forces generated between the tyre 10 and the load belt 260. The belt rollers 261 are symmetrically arranged on both sides of a center plane C of the load belt apparatus 26, wherein the parallel axes $B_1$ and $B_2$ of the first and second belt rollers 261 lie within a plane perpendicular to the center plane C. The run of the load belt 260 facing the tyre 10 (also called the "contact run" 263 of the belt) is freely tensioned between the first and second belt rollers 261. On the opposite side of the belt rollers 261 a so called free run 262 of the belt 260 is freely tensioned. When the load belt apparatus 26 engages the tyre 10, the contact run 263 of the load belt 260 is deflected so that the contact run comprises a contact portion or area 264 between two free belt portions. The free belt portions extend straight-lined between the contact area 264 and the belt rollers 261, while the contact portion or area 264 is curved to a certain extent corresponding to the flattened contact surface of the tyre tread. The belt rollers 261 are supported at the support frame 37 with a very high spring stiffness to provide a high belt tension. If the belt tension is strong enough, deflection of the load belt 260 and curvature of the contact area 264 of the belt are small, i.e. the radius of curvature is large and usually is larger than the diameter of a conventional load roller. Furthermore, the curvature of the contact area 264 has the same direction as the curvature of the unloaded tyre so that the curvature of the contact surface of the tyre tread is not inverted. Thus, the shape of the contact area 264 of the load belt 260 is a good approximation of a flat road surface in comparison to cylindrical contact area of a conventional load roller 126.

In a further development of the invention, the load belt apparatus 26 may comprise a belt supporting element 265, preferably a single belt supporting element 265 arranged between the belt rollers 261 and suitable to support the backside of the load belt 260 in the contact area 264. The belt support element may have protrusions or grooves (not shown) for lateral guiding the belt and transferring lateral forces similar to the belt rollers 261, as described above. The belt support element 265 is carried on an element carrier 267. The element carrier 267 may be fixedly arranged in the support frame 27 of the load belt apparatus 26 so that the belt support element 265 is arranged in a certain predetermined distance to the backside of the contact run 264 of the belt 260 in an unloaded condition. When the belt 260 engages the tyre 10, the contact area 264 of the deflecting belt 260 contacts the supporting element 265 so that the contact area 264 is at least partially further flattened. In a further development, the element carrier 267 may be movable in a direction along the center plane C so that the distance to the unloaded belt 260 may be adjusted. In this manner, the control device 32 may be able to control the force or amount of engagement between the belt contact area 264 and the support element 265. To this purpose, at least one further load cell 266 may be arranged between the element carrier 267 and the support element 265 to measure the force applied by the support element 265 in radial direction of the wheel, i.e. perpendicular to the load belt along the center line C. It is also possible to provide force sensors (load cells, for example) between the support element 265 and the element carrier 267 for measuring forces acting in a direction parallel to the rotary axis of the wheel. Moreover, it is feasible to provide force sensors for measuring forces acting on the support element in a circumferential direction of the wheel (i.e. in running direction of the load belt).

Figure 8:
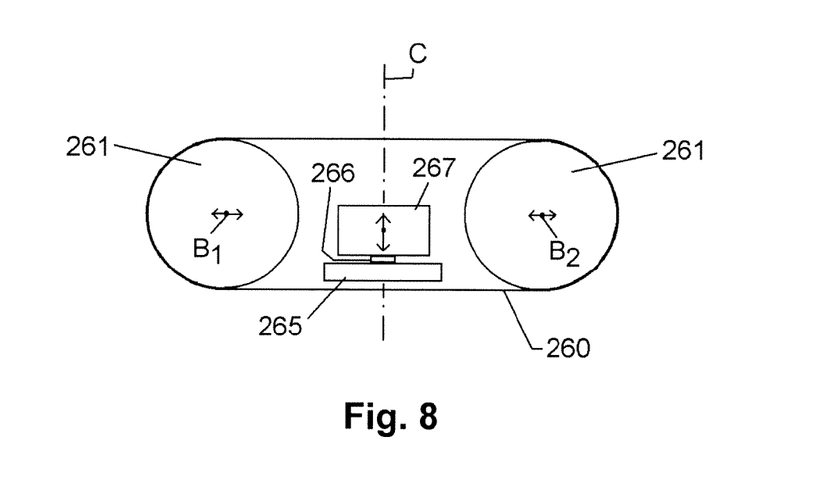
FIG. 8 schematically shows a further embodiment of the load belt apparatus according to the invention.

The belt support element 265 may be a flat plate having a slide surface facing the backside of the load belt 260, as shown in FIG. 8.

Figure 9:
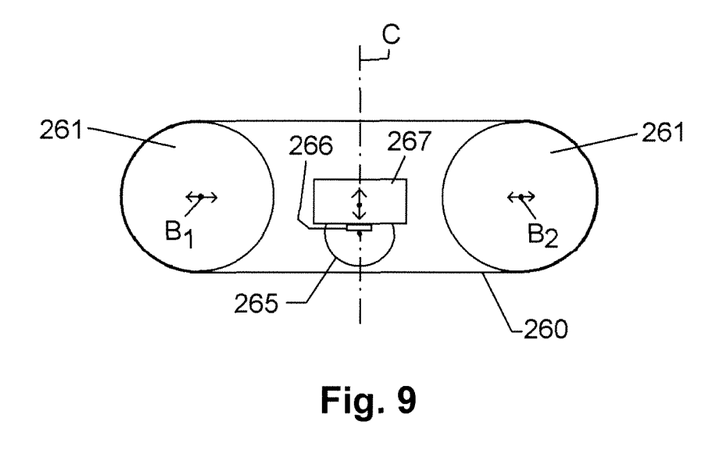
FIG. 9 schematically shows a further embodiment of the load belt apparatus according to the invention.
Figure 11:
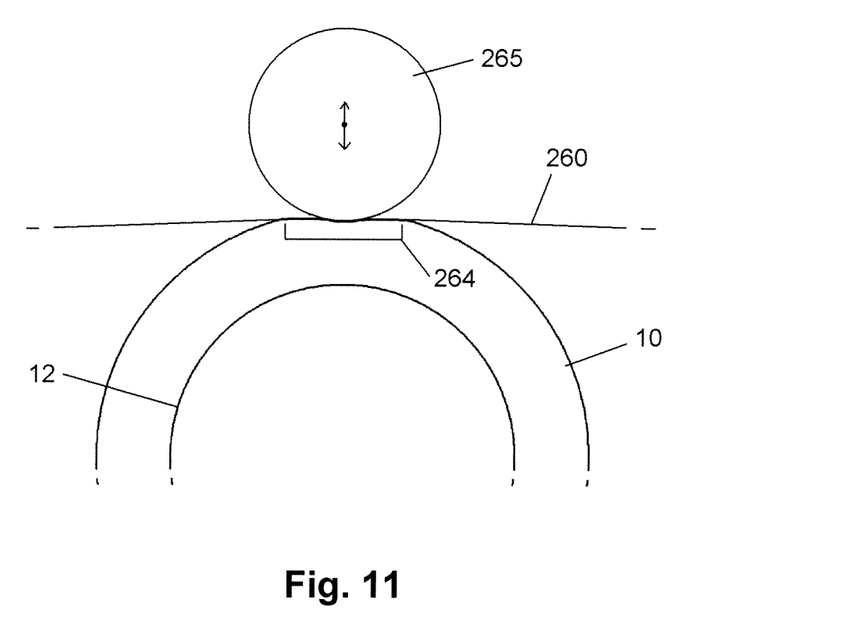
FIG. 11 schematically shows an enlarged depiction of the contact area between the tyre and the load belt.

FIG. 9 shows a further development of the invention in which the belt support element 265 is formed by a belt support roller 265. This is advantageous because the support roller avoids sliding friction between the backside of the load belt 260 and the support element 265, and thus suppresses generation of wear and disturbing friction forces affecting the measurement. As shown in FIG. 11, the belt support roller 265 provides for a further flattening of the contact area 264 by shaping the contact surface between the load belt 260 and the tyre 10 in a slightly waved shape in longitudinal direction of the belt 260 having a small area with a merely slightly inverted curvature in the middle between two portions with non-inverted curvature. In this manner, the combined effect of the belt tension and the supporting effect of the belt support roller 265 results in a more flattened contact area 264 because the load belt does not completely follow the cylindrical surface of the support roller 265 and the contact area 264 extends beyond the surface of the support roller 265 on both sides in longitudinal direction (running direction) of the load belt. Thus, a good approximation of a flat road surface can be obtained without any sliding contact between the load belt 260 and the belt supporting element 265.

In a further development of the invention, the belt support element 265 may comprise a plurality of (at least two) belt support rollers (not shown). In this case, the belt support rollers may have a constant diameter along their axial direction over the whole width of the load belt and may be arranged adjacent to each other in running direction of the load belt in a distance somewhat larger than their diameter. In another embodiment, the plurality of belt rollers may have a plurality of relative short axial portions with larger diameter alternating with somewhat longer axial portions with smaller diameter, so that adjacent belt support rollers may be arranged in a distance smaller than the larger diameter of the rollers, while the larger diameter portions of one roller are arranged opposite to the smaller diameter portions of an adjacent roller (i.e. the large diameter portions of adjacent rollers are arranged in a staggered manner). In this manner, a more uniform support of the load belt may be achieved resulting in a better approximation of a flat road surface.

Figure 10:
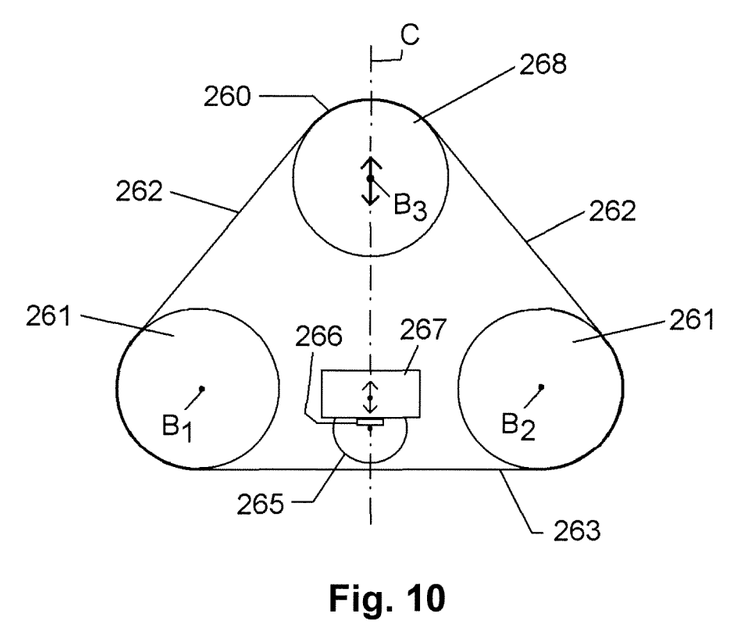
FIG. 10 schematically shows a further embodiment of the load belt apparatus according to the invention.

In a further development of the invention, as shown in FIG. 10, the load belt apparatus may have a third belt roller 268 used as a tensioning roller 268 for tensioning the load belt 260. Preferably, the tensioning roller 268 is arranged such that its axis $B_3$ lies within the center plane C and that it divides the free run 262 of the load belt 260 into two portions, thus forming a triangle of belt rollers 261, 268 around which the load belt 260 runs. With the tensioning roller 268 more space is provided between the first and second belt roller 261 so that a belt support roller with a larger diameter can be used, and furthermore, the diameters of the first and second belt rollers 261 may be reduced to achieve a more compact load belt apparatus 26.

The tyre changer can be provided with a scanning device 16 designed to scan the lateral runout of at least one tyre side wall, particularly at the angular position of the load belt apparatus 26 in a condition in which the wheel/tyre assembly 14 is loaded by the load belt apparatus 26, as shown in the FIG. 4 or in which the tyre 10 is in a removed position from the load belt apparatus 26, analog to FIG. 2. An appropriate contactless scanning device is described in U.S. Pat. No. 7,738,120 B2 in form of a sheet of light imaging system based on the principle of optical laser triangulation. The optical scanning device can have a light source that emits a light beam in a planar light beam 42 shaped in a sheet of light or a planar light beam onto the wheel surface, in particular the side wall of the tyre and intersects the side wall surface in a plurality of impingement points along a stripe-shaped impingement area. At each of the impingement point, the light beam is scattered in a plurality of light rays that are reflected. At least a plurality of these reflected light rays will be then concentrated or focused by a lens system or input pupil into a stripe-shaped projected image area on a two-dimensional photosensitive sensor surface. The spacings and thus positions of the individual impingement points sensed at the wheel or the rim can then be determined by the triangulation method in dependence on the directions of the emitted and reflected light beams, particularly on the sensor signals. From the signals, the lateral runout of the tyre 10 on one side or on both sides can be determined. The scanning devices are connected to the control device 32 and the measured values around the periphery of the tyre 10 can be used to determine the tyre stiffness.

Figure 5:
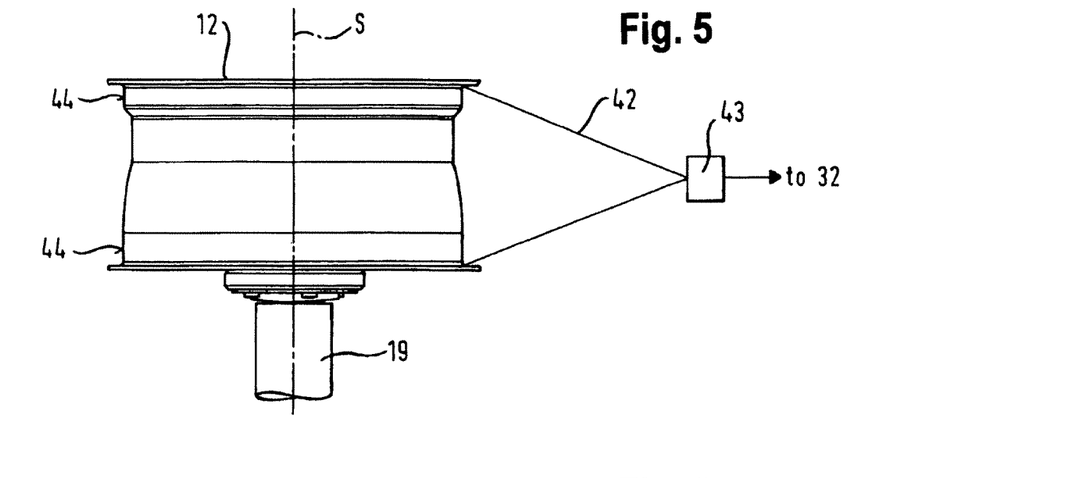
FIG. 5 shows the scanning of the peripheral surface of a wheel rim.

The tyre changer according to the shown embodiment may include an additional scanning device 43 to determine the radial runout of the wheel/tyre assembly 14, as shown in FIG. 4. The scanning device 43 can be arranged on the support 22 or on the support 20, as known from U.S. Pat. No. 7,768,632 B2. Further, the scanning device 43 can be used to determine the runout of the wheel rim 12, especially the runout of the outer peripheral surface of the wheel rim 12, as shown in FIG. 5. The scanning device 43 has the same configuration as the above explained scanning device 16. The light beam 42 of the scanning device 43 scans preferably the bead seat surfaces 44 of the wheel rim 12 to determine the radial runouts on the peripheries of these surfaces.

An angular measuring device 21 is connected to the shaft 19 of the mounting device 18 to determine the angular position of the wheel/tyre assembly during its rotation, especially during the measurement of the force variations and of its radial and lateral runouts, especially the runout of the tyre side walls. Further, the angular positions of the runouts on the outer periphery of the wheel rim 12, in particular in the peripheral bead seat surfaces 44 are determined with the angular measuring device 21 whose measuring signal is delivered to the control device 32.

The tyre changer according to the embodiment includes matching means 17 to remount in cooperation with the control device 32 the tyre 10 on the wheel rim 12 into angular positions in which high spots of the measured force variations and low spots of the measured radial rim runout, especially on the bead seat surfaces 44 of the wheel rim 12, are brought into an angular positioning to each other that at least one of the match conditions are met: resulting vibrations or resulting radial force variations or radial runouts of the wheel/tyre assembly are minimized. To achieve at least one of these conditions, the low spot of the radial rim runout, especially on the bead seat surfaces and the high spot of the force variation are brought substantially into the same angular position around the periphery of the wheel/tyre assembly 14. The matching means 17 can be designed as non-rotating clamping surfaces in the central portion of the bead release tools 24. Instead of rollers 24 as bead release tools, non-rotating bead release members or additional clamping members can be used to perform the clamping action on the tyre during the matching operation. The matching operation is performed after the release of the tyre 10 from the peripheral surface of the load belt apparatus 26 (analog to FIG. 1).

The bead releasing tools, for instance the bead release rollers 24 are pressed on the side walls of the tyre to release the tyre 10 on its both sides from the wheel rim, while the wheel/tyre assembly 14 is rotated by the rotary drive 35. Then, the tyre is clamped between the matching means 17 and kept in a stationary angular position. Under the control of the control device 32 the wheel rim 12 is rotated by the rotary drive 35 in the determined position in which at least one of the before explained match conditions are met.

The constant load which is applied by the load belt apparatus 26 onto the peripheral tyre surface may be about 3 kN to 4 kN. However, also a smaller load can be used, in particular when a low tyre inflation pressure is provided. The rotational speed during the force measurement is about 70 rpm to 100 rpm. In order to perform the matching operation, the first harmonics of the measured force variations and of the measured rim runout are used to control the rotation of the shaft 19 with respect to the tyre which is stationary fixed by the matching means 17. In order to get additional information of the tyre quality, higher harmonics can be determined during the force measurement.

Figure 6:
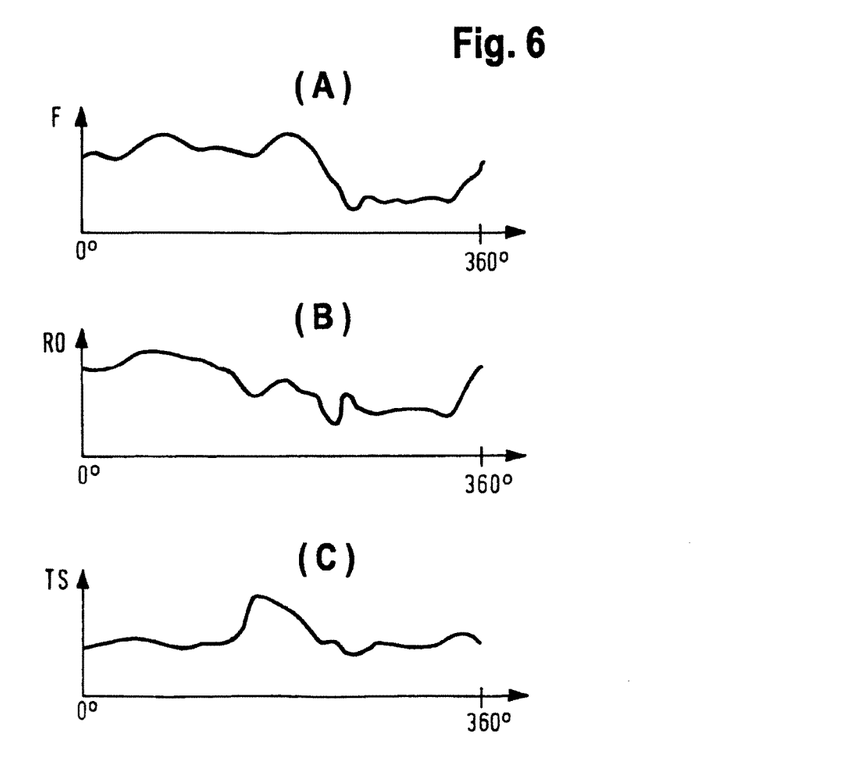
FIG. 6 shows diagrams for the illustration of a method for determining the tyre stiffness.

FIG. 6 illustrates a method for determining the tyre-stiffness around the tyre periphery through 360° about the axis S which corresponds to the axis of the tyre. The diagram (A) shows the radial force variation F of the wheel/tyre assembly 14 through 360° about the axis 8. The diagram (B) shows the radial runout R0 of the rim, especially of the bead seat surfaces resulting from a measurement according to FIG. 5. The starting point (angular position 0°) of the measurement is provided by 20 an index mark on the wheel rim 12.

The diagram (C) shows the tyre-stiffness TS within 360° about the axis S which is identical with the tyre axis. The diagram (C) is obtained by subtracting the diagrams (A) and (B) from each other, in particular by subtracting the diagram (B) from the diagram (A). The subtracting operation can be conducted by a computing section of the control device 32.

The matching operation can be controlled also in that the determined tyre-stiffness and the runout of the rim are used to rotate the tyre on the wheel rim a respective angular position for minimizing/rotating vibrations or force variation of the wheel/tyre assembly. For instance, a low spot of the runout of the wheel rim and a high spot of the tyre stiffness are brought in a match position.

It has to be noticed that the load belt apparatus of the invention may also be arranged in a horizontal manner at the base frame of the automotive shop service machine (tyre changer) while the wheel mounting device 18 may be arranged with a horizontal axis S. The mounting device 18 and/or the load belt apparatus 26 may then be moved towards or apart from each other in a vertical direction, while the load belt apparatus 26 and/or the mounting device 18 may be moved in a horizontal direction to adjust the relative position of the load belt apparatus to different tyre type having different widths, for example. Such an arrangement is in particular suitable for other automotive shop service machines, such as wheel balancers for example, which can be equipped with the load belt apparatus of the invention as well.

LIST OF REFERENCES 10 tyre
11 linear drive
12 wheel rim
13 load cell
14 wheel/tyre assembly (vehicle wheel)
15 calibration means
16 scanning device
17 matching device
18 mounting device
19 shaft of the mounting device
20 support (pillar) of the roller
21 angular measuring device
22 support of the mounting device
23 mounting/demounting tool
24 bead releasing tools
25 tool carrier
26 load belt apparatus
261 belt roller
262 free run of load belt
263 contact run of load belt
264 contact area of load belt
265 belt support element
266 load cell
267 element carrier
268 tensioning roller
126 load roller
27 force feeling element
28 peripheral surface (thread surface) of the wheel/tyre assembly
29 shaft support
30 sensor device
31 self-locking mechanical means
32 control device
33 slotted hole
34 roller shaft
35 rotary drive
36 sliding carriage
37 support frame, casing of load belt apparatus
38 motor (electric motor)
39 threaded spindle
40 motor, electric motor
41 internal thread
42 planar light beam
43 scanning device
44 bead seat surfaces

The invention claimed is:

1. A tyre changer, comprising: a mounting device for receiving at least a wheel rim of a wheel/tyre assembly, the mounting device having an axis (S), a load belt apparatus being able to contact a peripheral surface of the wheel/tyre assembly and to apply a predetermined force to the peripheral surface of the wheel/tyre assembly, a control device for controlling the predetermined force applied by the load belt apparatus during a rotation of the wheel/tyre assembly about the axis (S) of the mounting device and a sensor device for measuring force variations acting between the peripheral surface of the wheel/tyre assembly and the load belt apparatus, wherein supports of the load belt apparatus and of the mounting device are designed for a relative movement of the load belt apparatus and of the mounting device towards each other to apply the predetermined force to the peripheral surface of the wheel/tyre assembly.

2. The tyre changer according to claim 1, wherein the supports of the load belt apparatus and of the mounting device are designed for a relative movement of the load belt apparatus and of the mounting device towards each other along a straight line.

3. The tyre changer according to claim 1, wherein the mounting device is movable towards the load belt apparatus to achieve an engagement between the peripheral surface of the wheel/tyre assembly and the load belt apparatus.

4. The tyre changer according to claim 1, wherein the load belt apparatus is movable towards the mounting device to achieve an engagement of the peripheral surface of the wheel/tyre assembly and of the load belt apparatus.

5. The tyre changer according to claim 1, wherein a drive is provided for driving a load belt of the load belt apparatus.

6. The tyre changer according to claim 1, wherein locking means are provided to lock the axis (S) of the mounting device and the load belt apparatus to a constant distance therebetween.

7. The tyre changer according to claim 1, wherein matching means are provided to remount the tyre on the wheel rim into an angular position in which high spot of the force variations and low spot of the radial rim remount match.

8. Method of measuring force variations acting between a peripheral surface of a wheel/tyre assembly and a load belt apparatus, in which the wheel/tyre assembly is mounted on a mounting device of a tyre changer, the mounting device having an axis (S), wherein the load belt apparatus and the wheel/tyre assembly are moved relatively towards each other to apply a controlled predetermined force to a peripheral surface of the wheel/tyre assembly and force variations acting between the peripheral surface and the load belt apparatus are measured, while the wheel/tyre assembly is rotated about the axis (S).

9. The method according to claim 8, wherein the load belt apparatus and the wheel/tyre assembly are moved relatively towards each other along a straight line.

10. The method according to claim 9, wherein force variations acting along the straight line extending from the axis (S) of the mounting device along a center plane (C) of the load belt apparatus and/or acting perpendicular to the straight line are measured.

11. The method according to claim 8, wherein force variations acting along the straight line extending from the axis (S) of the mounting device along a center plane (C) of the load belt apparatus and/or acting perpendicular to the straight line are measured.

12. A load belt apparatus for use in an automotive shop service machine, in particular a tyre changer, comprising:
a support frame,
at least two belt rollers supported at the support frame,
a load belt freely tensioned around the belt rollers, and
a belt support element arranged to support a backside of a contact area of the load belt when the load belt engages the peripheral surface of a wheel/tyre assembly,
wherein the belt support element is arranged to be movable along a center plane (C) of the load belt apparatus.

13. The load belt apparatus according to claim 12, wherein the belt support element is formed by at least one belt support roller.

14. The load belt apparatus according to claim 13, further comprising a third belt roller or tensioning roller to form a triangle of belt rollers.

15. The load belt apparatus according to claim 12, further comprising a third belt roller or tensioning roller to form a triangle of belt rollers.

* * * * *